United States Patent
González Calderón

(10) Patent No.: US 11,691,505 B2
(45) Date of Patent: Jul. 4, 2023

(54) SUPPORT FOR THE ANCHORING OF AN AUTOMOTIVE CLUTCH HYDRAULIC PUMP

(71) Applicant: Darío Ernesto González Calderón, Aguascalientes (MX)

(72) Inventor: Darío Ernesto González Calderón, Aguascalientes (MX)

( * ) Notice: Subject to any disclaimer, the term of this patent is extended or adjusted under 35 U.S.C. 154(b) by 87 days.

(21) Appl. No.: 17/291,652

(22) PCT Filed: Oct. 7, 2019

(86) PCT No.: PCT/MX2019/000102
§ 371 (c)(1),
(2) Date: May 6, 2021

(87) PCT Pub. No.: WO2020/096440
PCT Pub. Date: May 14, 2020

(65) Prior Publication Data
US 2021/0402876 A1  Dec. 30, 2021

(30) Foreign Application Priority Data

Nov. 7, 2018  (MX) .................... MX/a/2018/013962

(51) Int. Cl.
*B60K 23/02*  (2006.01)
*F16M 13/02*  (2006.01)

(52) U.S. Cl.
CPC ............. *B60K 23/02* (2013.01); *F16M 13/02* (2013.01)

(58) Field of Classification Search
CPC .......... B60K 23/02; F16M 13/02; G05G 1/46; F16F 7/09; B60T 11/18
See application file for complete search history.

(56) References Cited

U.S. PATENT DOCUMENTS

| 3,371,486 | A | * | 3/1968 | Hager | ..................... G05G 1/46 |
| | | | | | 74/516 |
| 3,575,063 | A | * | 4/1971 | Harrom | ................. B60K 23/02 |
| | | | | | 192/219.7 |
| 6,000,511 | A | * | 12/1999 | Ebert | ....................... G05G 1/30 |
| | | | | | 192/12 C |

(Continued)

FOREIGN PATENT DOCUMENTS

| DE | 102009013988 A1 | 10/2009 |
| DE | 102010048510 A1 | 5/2011 |

(Continued)

OTHER PUBLICATIONS

International Search Report of PCT/MX2019/000102, dated Apr. 24, 2020.

*Primary Examiner* — Eret C McNichols

(57) ABSTRACT

The present invention relates to a mounting bracket for the fastening an automotive clutch hydraulic pump as an automotive repair or spare part; the mounting bracket comprises an mounting bracket assembly consisting of a washer, a coupling and a cover. This mounting bracket assembly is inserted through one extremity of the damaged pedal base, and the nut with which the mounting bracket assembly will be screwed is installed through the interior of the pedal base; the safety grub screws are tightened, leaving it ready to withstand the forces exerted between the clutch pedal and the automotive hydraulic pump.

6 Claims, 3 Drawing Sheets

(56) References Cited

U.S. PATENT DOCUMENTS

| | | | | |
|---|---|---|---|---|
| 6,322,284 | B1 | 11/2001 | Bonardo et al. | |
| 8,381,862 | B2* | 2/2013 | Hjerpe | G05G 1/32 |
| | | | | 180/274 |
| 8,863,614 | B2* | 10/2014 | Ishizuki | B21D 35/001 |
| | | | | 74/563 |
| 9,975,527 | B2* | 5/2018 | Kawazu | G05G 1/30 |
| 2009/0229402 | A1* | 9/2009 | Khan | B60T 7/06 |
| | | | | 74/512 |
| 2011/0162479 | A1* | 7/2011 | Mori | G05G 1/30 |
| | | | | 74/512 |
| 2012/0325990 | A1* | 12/2012 | Ishizuki | B21D 35/001 |
| | | | | 72/275 |
| 2015/0274142 | A1* | 10/2015 | Ishizuki | B60T 11/18 |
| | | | | 188/152 |
| 2020/0362937 | A1* | 11/2020 | Kaneko | G05G 1/46 |
| 2021/0062859 | A1* | 3/2021 | Chen | F16B 47/00 |
| 2021/0402876 | A1* | 12/2021 | González Calderón | |
| | | | | B60K 23/02 |

FOREIGN PATENT DOCUMENTS

| | | | | |
|---|---|---|---|---|
| DE | 102015201335 A1 * | 8/2015 | ............ | B60K 23/02 |
| FR | 2796174 A1 * | 1/2001 | ............ | B60K 23/02 |
| GB | 2382389 A | 5/2003 | | |
| KR | 100928150 B1 * | 11/2009 | ............ | B60K 23/02 |
| WO | WO-2007063657 A1 * | 6/2007 | ............ | B60K 23/02 |

* cited by examiner

SUPPORT FOR THE ANCHORING OF AN AUTOMOTIVE CLUTCH HYDRAULIC PUMP

BACKGROUND

The present invention relates to the field of the automotive industry, specifically to Chevrolet™ brand utility vehicles with manual transmission such as Pick-ups and dual wheel trucks that have a hydraulic clutch system.

Said system comprises a plastic base that holds the clutch pedal at one end thereof and has an irregular octagonal-shaped hole at the opposite end designed to allow the hydraulic pump to be mounted and partially introduced, and an eighth of a turn is given to fasten said hydraulic pump.

The hydraulic pump is only supported by four vertices of the irregular octagonal body of the hydraulic pump in the base, which are insufficient to withstand the forces exerted from the pedal on the pump.

This causes the useful life of the clutch pedal base to be limited so much that vehicles of this type with only one year of use can undergo the breakage of the clutch pedal base and require the replacement of such entire spare part (base and pedal) since this is the only way in which it is sold by the distributor.

In view of the need for a solution to this technical problem, the present invention conceives a mounting bracket that could be used as a spare or replacement part to solve said problem.

For this reason, protection is sought for said mounting bracket for fastening an automotive hydraulic pump by means of the present application as it is a metal mounting bracket assembly and nut which are installed on the damaged clutch pedal base, thereby solving the technical problem.

The characterizing parts and details of said mounting bracket are clearly shown in the following description and in the accompanying drawings.

DETAILED DESCRIPTION

The mounting bracket for fastening an automotive hydraulic pump 8 referred in the present invention solves a technical problem caused by the lack of a solid support for the pump 8 in the clutch pedal base 6 made of plastic material, wherein originally it is only supported by points and does not have the necessary strength to withstand the forces involved, which causes the clutch pedal base 6 to break.

Said pedal base 6 has an irregular octagonal hole at one end thereof, wherein the irregular octagonal body of the hydraulic pump 8 is coupled, said hydraulic pump 8 being only supported by four vertices where the irregular octagonal body of the hydraulic pump 8 matches the irregular octagonal hole, which causes the pedal base 6 to break easily and be unusable.

So far, the only solution to said technical problem is to replace the pedal base 6 with a new one, this initially involves disassembling it, and to do so it is necessary to move and uninstall several structural and electrical vehicle components, and only then, will the technician have access to carry out the replacement of the damaged pedal base 6, due to the existing difficult access to change the part, without this being a definitive solution to the technical problem of the original pedal base 6 of a vehicle.

Figure 7:
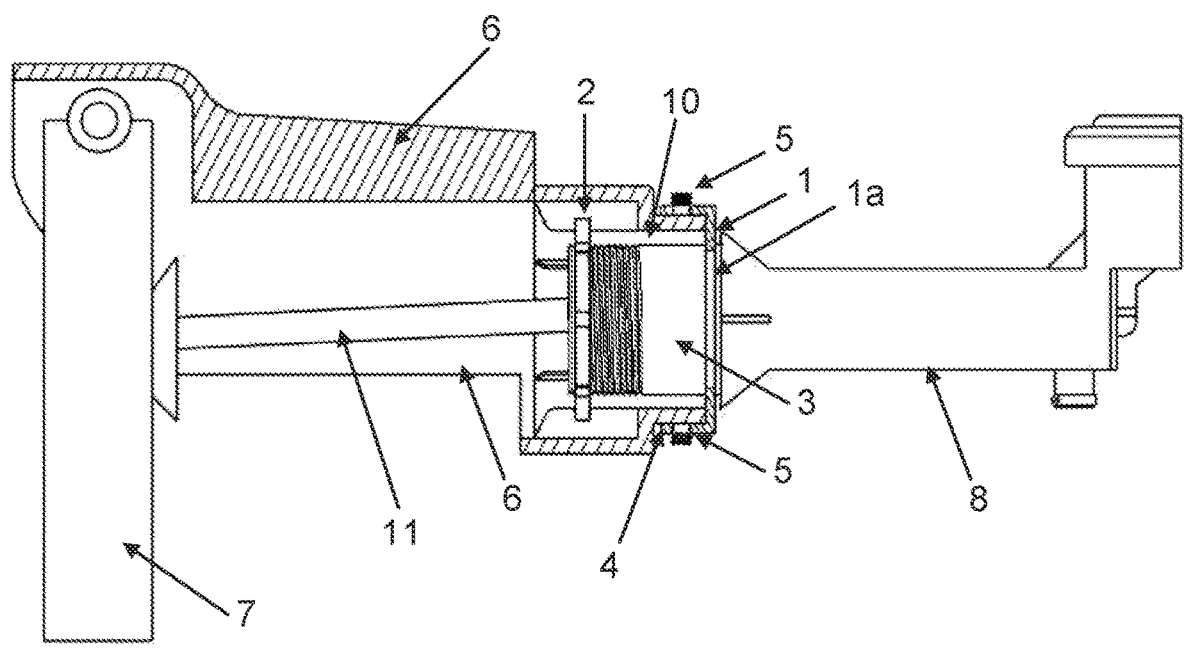
FIG. 7 is a perspective view of a pedal, the pedal base, the hydraulic pump shaft, the grub screws, the pump, the mounting bracket assembly, and the nut.

The mounting bracket for fastening the automotive hydraulic pump 8 of present invention is designed to withstand the forces exerted between the clutch pedal 7 and the hydraulic pump 8, since it takes advantage of the structure of the pedal base 6, on the interior with the nut 2 mounted there in and on the exterior with the cover 4 mounted by means of the grub screws 5 as shown in FIG. 7, which results in a solid support that solves said technical problem as seen in FIG. 7.

It is only necessary to rough or remove the plastic material that has remained from the damaged irregular octagonal hole of the pedal base 6 by using a roughing tool until a hole large enough to insert the mounting bracket assembly 10 into the pedal base 6 is obtained, as seen in FIG. 7.

Figure 1:
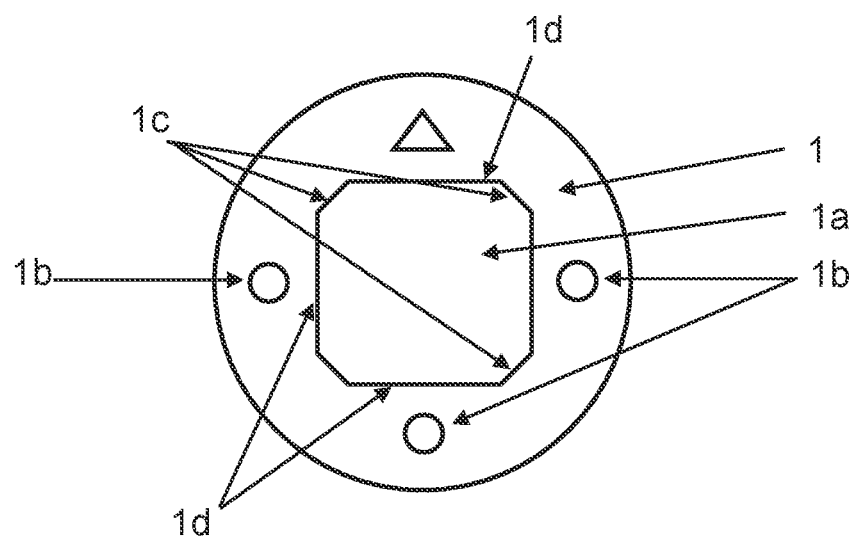
FIG. 1 is a perspective view of a washer having an irregular octagonal hole and adjustment holes.

Said mounting bracket comprises a mounting bracket assembly 10 comprising:

A washer 1 that has an octagonal hole 1a and adjustment holes 1b as seen in FIG. 1; wherein the octagonal hole (1a), comprises sides with different length, short length sides 1c and large length sides 1d, alternatively arranged between them to conform the octagonal hole.

Figure 2:
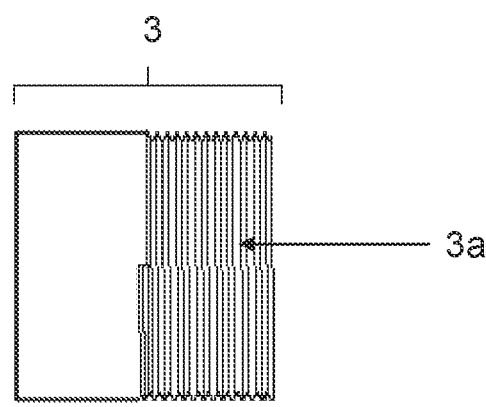
FIG. 2 is a perspective view of a threaded coupling.
Figure 4:
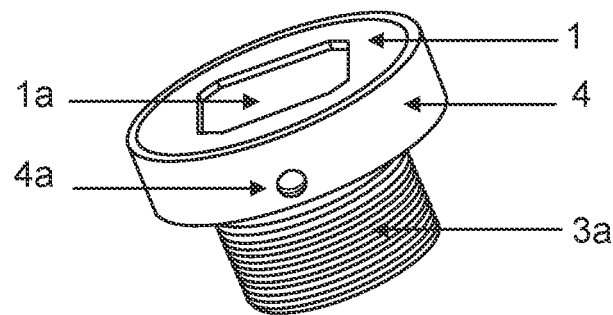
FIG. 4 is a perspective view of an assembled mounting bracket assembly, comprising a washer with irregular octagonal hole, a coupling thread, grub screw holes, and a cover.

A coupling 3 that has a threaded surface 3a at one end thereof as seen in FIG. 2, and that is welded to the center of the washer 1 at the other end, leaving the irregular octagonal hole 1a free, as shown in FIG. 4, so that the hydraulic pump shaft 11 can slide through the center of the washer 1 and of the coupling 3 as seen in FIG. 7, said shaft being arranged in the interior from one end of the pedal base 6 to the opposite end where it is coupled to the clutch pedal 7 as seen in FIG. 7.

Figure 3:
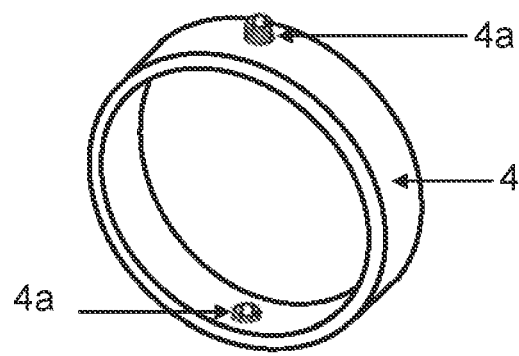
FIG. 3 is a perspective view of a cover having grub screw holes.

A cover 4 having grub screw holes 4a, wherein grub screws 5 are placed as shown in FIG. 3, which will serve to fasten the mounting bracket assembly on the exterior of the damaged pedal base 6, said cover 4 is welded at one end thereof to the exterior of the washer 1 as shown in FIG. 4, leaving a gap between the cover 4 and the coupling 3, which will serve to insert the mounting bracket assembly 10 onto the pedal base 6 at the damaged end as shown in FIG. 7, and for securing said mounting bracket assembly 10.

Figure 5:
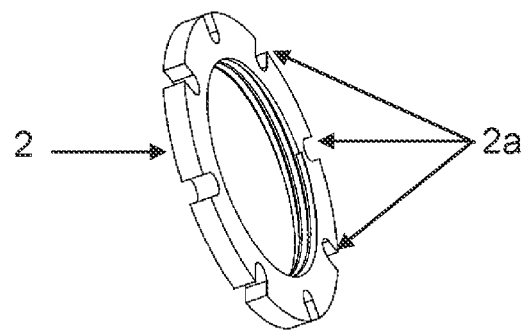
FIG. 5 is a perspective view of the nut and flanges.
Figure 6:
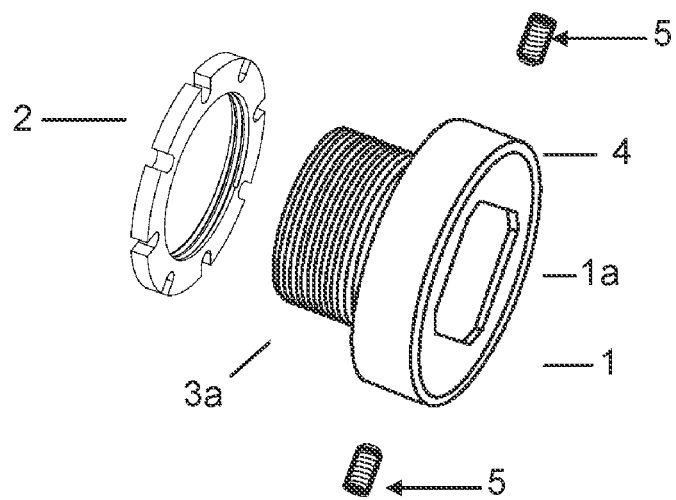
FIG. 6 is a side perspective view of the mounting bracket assembly comprising the nut, the coupling thread, the grub screws, the cover, the irregular octagonal hole, and the washer.

And the nut 2 having flanges 2a is placed inside the pedal base 6, as seen in FIGS. 5 and 7, said nut flanges 2a are coupled to the pedal base 6 structure, which provide a proper configuration for screwing the mounting bracket assembly 10 into the nut 2.

This provides an embracing arrangement onto the pedal base 6, then the grub screws 5 of the cover 4 arranged onto the pedal base 6 are tightened, which will prevent the automotive hydraulic pump support from loosening as seen in FIG. 7.

Once the mounting bracket assembly 10 has been installed on the pedal base 6, the hydraulic pump 8 is installed in its original position without having to disassemble the pedal base 6 from the vehicle.

Said support is made of carbon steel which provides strength and durability.

While foregoing is directed to the preferred embodiment of the present invention, other and further embodiments of the invention may be devised without departing from the basic scope and spirit thereof, and the scope thereof is determined by the claims that follow.

The invention claimed is:

1. Mounting bracket for fastening an automotive hydraulic pump (8) to be installed between an external side and an internal structure of a pedal base (6), said mounting bracket characterized by comprising:
   a. a mounting bracket assembly (10) comprising:
      i. an washer (1) having a hole (1*a*) adapted to fasten the automotive hydraulic pump (8);
      ii. a coupling (3) having a side threaded and an opposite side that is projected from the washer (1) without interference with the hole (1*a*) of the washer (1);
      iii. a cover (4) integral with the washer (1), leaving a gap between the cover (4) and the coupling (3); and
   b. a nut (2) with flanges (2*a*);

wherein the mounting bracket is installed on the pedal base (6), by placing the nut (2) coupled in the internal structure of the pedal base (6) by the flanges (2*a*) and threading with the coupling (3); and wherein the cover (4) is coupled on the pedal base (6) external side, making a embracing arrangement over it, and where the mounting bracket provides a solid support to support the automotive hydraulic pump (8) in a firm and secure manner in the hole (1*a*) to withstand the forces involved in the pedal base (6).

2. The mounting bracket, according to claim 1, characterized by the hole (1*a*) of the washer (1) is a adapted to the automotive hydraulic pump (8) shape for sustaining and fastening the automotive hydraulic pump (8), wherein the hole (1*a*) of the washer (1) is an octagonal hole (1*a*), having sides with different length, with short length sides (1*c*) and large length sides (1*d*) alternatively arranged between them.

3. The mounting bracket, according to claim 1, characterized by the gap between the cap (4) and the coupling (3) serves to insert the mounting bracket assembly (10) onto the pedal base (6) and for securing said mounting bracket assembly 10.

4. The mounting bracket, according to claim 1, characterized by the cover (4) comprises grub screws (5) for the mounting bracket assembly (10) subjection on the pedal base (6) external side.

5. The mounting bracket, according to claim 1, characterized by the mounting bracket assembly (10) and the nut (2) are of metal.

6. The mounting bracket, according to claim 5, characterized by the metal is carbon steel.

* * * * *